J. A. DYBLIE.
DUST CATCHER.
APPLICATION FILED JUNE 8, 1911.
1,045,532.
Patented Nov. 26, 1912.
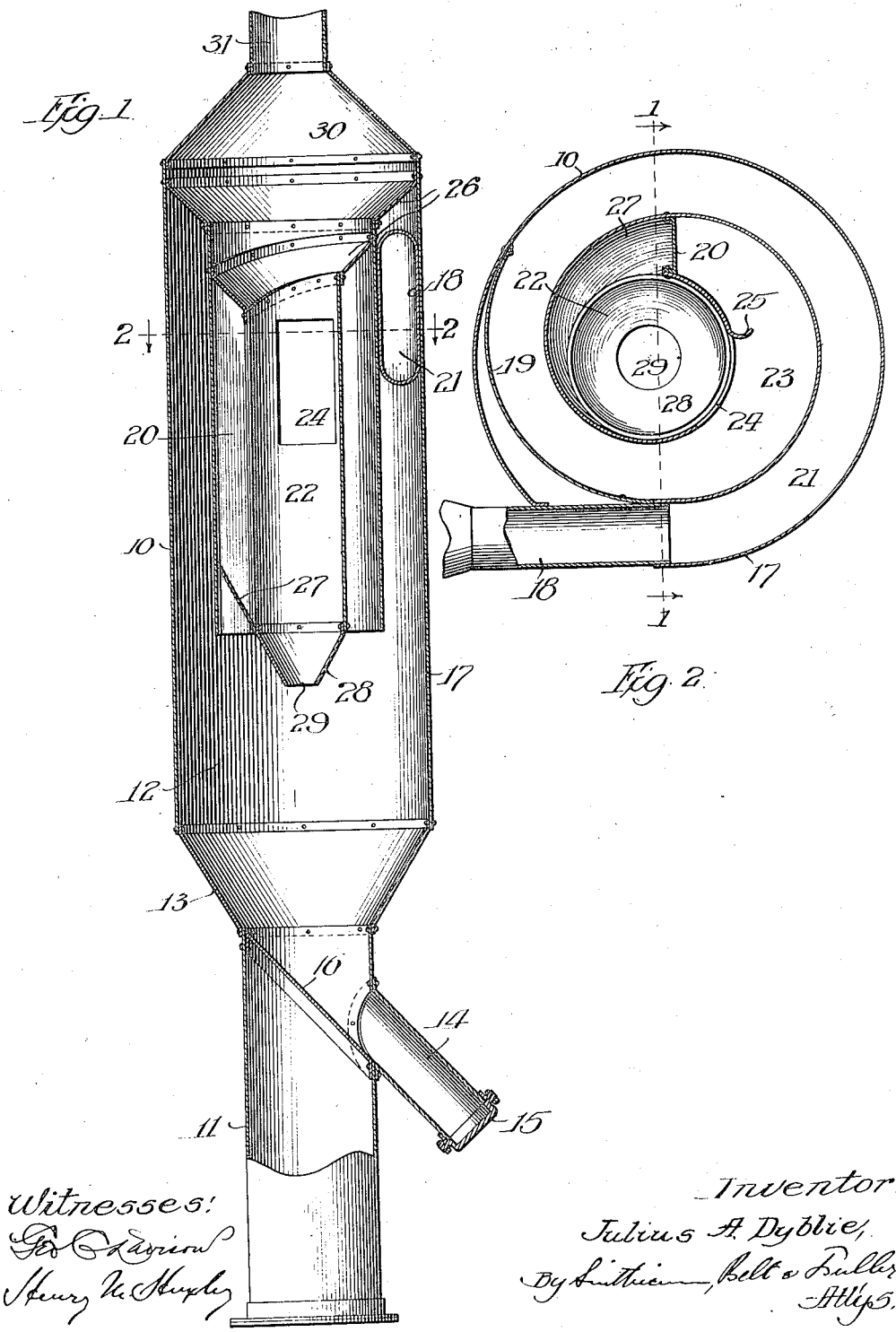

UNITED STATES PATENT OFFICE.

JULIUS A. DYBLIE, OF JOLIET, ILLINOIS.

DUST-CATCHER.

1,045,532.  Specification of Letters Patent.  Patented Nov. 26, 1912.

Application filed June 8, 1911. Serial No. 632,015.

*To all whom it may concern:*

Be it known that I, JULIUS A. DYBLIE, a citizen of the United States, residing at Joliet, in the county of Will and State of Illinois, have invented certain new and useful Improvements in Dust-Catchers, of which the following is a specification.

My invention relates to devices for removing dust from gas, and is particularly useful in connection with cleaning gas from blast furnaces and the like.

I am aware that dust-catchers have heretofore been used, but my dust-catcher combines certain features which render it more efficient than those of the prior art.

Described in general terms, my dust-catcher consists of a spiral conduit, the lower open edges of which are in communication with a dust-collecting chamber. The gas is introduced tangentially, and follows a spiral course toward the central axis of the apparatus, the spiral conduit being enlarged before the gas is introduced into a central chamber in communication with the outlet. The dust is expelled from the gas by centrifugal action, and falls through the lower open edges of the spiral conduit into the dust-collecting chamber. The central chamber is provided with a restricted opening at its lower end, and communicates, by means of a suitable aperture, with the innermost spiral of the spiral conduit.

One of the most important features of my invention consists in the provision of a wall at the end of the innermost spiral and a hook-shaped projection lying on the outer surface of the inner wall of said spiral between the end of the spiral and the aperture affording communication with the central chamber. The function of this hook, acting in conjunction with the wall at the end of the innermost spiral, is to catch dust which may remain in the gas and prevent it from entering the central chamber.

These and other advantages of my invention will be more readily understood by reference to the accompanying drawings, which show a preferred embodiment of my improvement, and in which—

Figure 1 is a vertical section through my dust-catcher, taken on the line 1—1 of Fig. 2; and Fig. 2 is a horizontal section taken on the line 2—2 of Fig. 1.

The dust-catcher, represented as a whole by 10, is supported on the base 11. In the lower part of the dust-catcher is the dust-collecting chamber 12, preferably having a cone-shaped lower portion 13. Communicating with the dust-collecting chamber 12 is the outlet 14, having the cap 15, which is occasionally removed in order to allow the dust to escape from the dust-collecting chamber 12. In order to prevent dust from passing into the supporting base 11, the obliquely disposed partition 16 is placed in the upper portion of the base 11, and serves to direct the dust into the outlet passage 14.

The casing 17 of the dust-catcher is preferably cylindrical, and gas is tangentially introduced into said casing by means of the inlet pipe 18. Bolted or otherwise suitably fastened to the inside of the outer casing 17 is the plate 19, which is bent so that a spiral is formed within the dust-catcher. At the inner end of the plate 19 is placed the vertical plate 20, thus interrupting communication between the spiral conduit 21 and the central chamber 22. Toward its inner end the spiral conduit 21 is enlarged at 23 for the purpose of decreasing the velocity of the gas introduced. An aperture 24 affords communication between the spiral conduit 21 at its portion 23 and the central chamber 22. The hook-like projection 25 is provided extending into the portion 23 of the conduit 21, and is for the purpose of catching dust which might otherwise be carried through the aperture 24 into the central chamber 22. In order to prevent communication between the upper ends of the turns of the spiral conduit 21, the obliquely disposed plate 26 is provided. Beyond the vertical plate 20 the lower part of the spiral plate 19 is bent inwardly, as shown at 27, thus closing the lower portion of the central chamber 22. The cone 28 is suitably fastened to the lower portion of the chamber 22, and has at its bottom the restricted opening 29. The central chamber 22 communicates at its upper end with the upper portion 30 of the dust-catcher and with the outlet pipe 31.

Having thus described the construction of my dust-catcher, its operation may now be readily understood. The gas is introduced tangentially through the inlet pipe 18, and is then passed in a spiral course through the conduit 21. By means of centrifugal action the dust is thrown toward the exterior of each turn of the spiral through which the gas passes, and this dust falls vertically through the open lower edges of the spiral turns into the dust-collecting chamber 12, and thence into the dust outlet 14, from which it may be periodically removed by taking off the cap 15. When the dust reaches the expanded portion 23 of the conduit 21, its velocity is somewhat decreased, and the dust is brought into contact with the outer wall of this portion of the conduit and with the wall 20. A certain portion of the dust is also caught by means of the hook 25. The dust thus forced against the wall 20 and the hook 25 drops downwardly into the dust-collecting chamber 12, in the same manner as just described. The gas from which the dust has largely been removed in this way passes through the aperture 24 into the central chamber 22, and then upwardly into the portion 30 of the dust-catcher, and thence through the outlet pipe 31. Any dust which is carried into the central chamber 22 will pass downwardly by gravity and into the dust-collecting chamber 12, through the aperture 29 in the cone 28. Although the dust-collecting chamber 12 is in direct communication with the open lower edges of the various turns of the spiral conduit 21, the gas will tend to follow the course of least resistance, and will pass through the aperture 24, which is located comparatively high in the apparatus, and for this reason there will be but little motion of the gas within the dust-collecting chamber 12.

It will be apparent to those skilled in the art that considerable change could be made in the exact construction which I have described and in the method of operation without departing from the spirit of my invention.

What I claim is:

1. In a dust-catcher, the combination of a spiral conduit, a central chamber having an aperture communicating with said conduit, and dust-collecting means extending along one edge of said aperture and extending into said conduit, substantially as described.

2. In a dust-catcher, the combination of a spiral conduit, a central chamber having an aperture communicating with said conduit, an abutment plate separating said spiral conduit from said central chamber, and a dust-collecting projection adjacent to said aperture and extending into said conduit, substantially as described.

3. In a dust-catcher, the combination of a spiral conduit having an open lower edge, means for introducing gas into said conduit, a dust-collecting chamber below the open edge of said conduit, a central outlet chamber having an aperture at its upper portion communicating with said conduit, an abutment plate separating said conduit from said central chamber and closing means for the upper edge of said conduit, whereby the gas introduced into said conduit will pass through a spiral course through said aperture into said outlet chamber and the dust expelled by centrifugal force will collect in said dust-collecting chamber, substantially as described.

4. In a dust catcher, the combination of a spiral conduit, a dust-collecting chamber communicating with said conduit, a central outlet chamber having an aperture communicating with said conduit, an abutment separating said conduit from said outlet chamber, and dust-collecting means projecting into said conduit between said abutment plate and said aperture, substantially as described.

JULIUS A. DYBLIE.

Witnesses:
CHAS. T. MASON,
CHAS. F. BANNON.